(12) United States Patent
Kawaguchi et al.

(10) Patent No.: US 6,694,945 B2
(45) Date of Patent: Feb. 24, 2004

(54) FUEL INJECTION QUANTITY CONTROL SYSTEM FOR ENGINE

(75) Inventors: Yoshio Kawaguchi, Kariya (JP); Katsuhiko Takeuchi, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/464,455

(22) Filed: Jun. 19, 2003

(65) Prior Publication Data

US 2003/0233997 A1 Dec. 25, 2003

(30) Foreign Application Priority Data

Jun. 20, 2002 (JP) ....................................... 2002-180353

(51) Int. Cl.$^7$ ................................................. F02B 3/00
(52) U.S. Cl. ..................... 123/299; 123/305; 123/436
(58) Field of Search ................................. 123/299, 305, 123/294, 436, 445

(56) References Cited

U.S. PATENT DOCUMENTS 4,508,075 A * 4/1985 Takao et al. ............ 123/339.11
5,016,591 A * 5/1991 Nanyoshi et al. ........ 123/406.2

FOREIGN PATENT DOCUMENTS

| JP | 2001-355500 | 12/2001 |
| JP | 2002-295291 | 10/2002 |

* cited by examiner

Primary Examiner—Bibhu Mohanty
(74) Attorney, Agent, or Firm—Nixon & Vanderhye P.C.

(57) ABSTRACT

An injection quantity control system for an internal combustion engine stores a value Qb, which is a sum of an FCCB correction value and an ISC correction value corresponding to an injection frequency of K times per combustion in multi-injection in an idling stabile state of the engine. The system stores a value Qc, which is a sum of the FCCB correction value and the ISC correction value corresponding to the injection frequency of N times. Based on a difference between the values Qb and Qc, a final learning value (Q1/K or Q1/N) is calculated. Thus, an injector individual difference, an inter-cylinder injection quantity variation, and an injector aging deterioration quantity can be discriminated from an increase in an engine-demanded injection quantity due to an engine load factor.

6 Claims, 10 Drawing Sheets

| PFIN | INJ | INTERVAL | | | | TFIN | NEt | Ps | EGR | THR | SCV |
|------|-----|----------|-------|-------|-------|------|-----|-----|-----|-----|-----|
|      |     | QP1-2 | QP2-3 | QP3-4 | QP4-5 |      |     |     |     |     |     |
| A | 5 | 10 | 11 | 12 | 13 | TDC | 750 | 760 | NO | OPEN | OPEN |
| B | 5 | ↑ | ↑ | ↑ | ↑ | TDC | ↑ | ↑ | ↑ | ↑ | ↑ |
| C | 5 | ↑ | ↑ | ↑ | ↑ | TDC | ↑ | ↑ | ↑ | ↑ | ↑ |
| D | 5 | ↑ | ↑ | ↑ | ↑ | TDC | ↑ | ↑ | ↑ | ↑ | ↑ |
| E | 5 | ↑ | ↑ | ↑ | ↑ | TDC | ↑ | ↑ | ↑ | ↑ | ↑ |

FIG. 11A

|  | #1 | #3 | #4 | #2 |
|---|---|---|---|---|
| A MPa |  |  |  |  |
| B MPa |  |  |  |  |
| C MPa |  |  |  |  |
| D MPa |  |  |  |  |
| E MPa |  |  |  |  |

FIG. 11B

|  | #1 | #3 | #4 | #2 |
|---|---|---|---|---|
| A MPa |  |  |  |  |
| B MPa |  |  |  |  |
| C MPa |  |  |  |  |
| D MPa |  |  |  |  |
| E MPa |  |  |  |  |

FIG. 12

|  | #1 | #3 | #4 | #2 |
|---|---|---|---|---|
| A MPa |  |  |  |  |
| B MPa |  |  |  |  |
| C MPa |  |  |  |  |
| D MPa |  |  |  |  |
| E MPa |  |  |  |  |

FUEL INJECTION QUANTITY CONTROL SYSTEM FOR ENGINE

CROSS REFERENCE TO RELATED APPLICATION

This application is based on and incorporates herein by reference Japanese Patent Application No. 2002-180353 filed on Jun. 20, 2002.

BACKGROUND OF THE INVENTION

1. Field of the Invention

The present invention relates to an injection quantity control system for an internal combustion engine for correcting an injector individual difference, an inter-cylinder injection quantity variation and an injector aging deterioration quantity in an injection quantity correction value for each cylinder of the engine or in an energization period correction value for an electromagnetic valve of an injector. Specifically, the present invention relates to a pilot injection quantity control system capable of performing a small quantity of pilot injection at least once before main injection by driving the electromagnetic valve of the injector by a plurality of times in compression stroke and expansion stroke of the engine.

2. Description of Related Art

Conventionally, there is a known common rail type fuel injection system for injecting high-pressure fuel, which is accumulated in a common rail, into each cylinder of a multi-cylinder diesel engine. In the common rail type fuel injection system, a small quantity of pilot injections are performed by a plurality of times before main injection, which can generate engine torque, so that combustion noise or engine vibration are reduced and exhaust gas performance is improved by performing stable combustion from the start of the main injection. The pilot injections are performed by driving the electromagnetic valve of the injector by a plurality of times in a compression stroke and an expansion stroke of the engine.

In the control of the fuel injection quantity injected into the cylinder of the engine, a command injection quantity is calculated in accordance with engine rotation speed and accelerator position. Then, an injection quantity command value is calculated in accordance with the command injection quantity and fuel injection pressure. Then, the electromagnetic valve of the injector is driven in accordance with the injection quantity command value. Variation in an actual injection quantity relative to the injection quantity command value is regulated through individual adjustment or the like of the injector of each cylinder.

However, the fuel quantity injected in the pilot injection is as very small as mainly 5 mm$^3$/st or smaller. Therefore, there is a possibility that the pilot injection may vanish or become excessive due to an injector individual difference, variation in the actual injection quantity with respect to fuel injection command pulse period (inter-cylinder injection quantity variation), or a deterioration in performance (function) of the injector with an aging change or the like (injector aging deterioration). As a result, an effect of the pilot injection cannot be achieved sufficiently.

As a measure to the above problem, injection quantity correction is performed in rotation speed variation inter-cylinder injection quantity correction (FCCB correction) and idling rotation speed injection quantity correction (ISC correction), which are publicly known methods. The injection quantity is corrected in accordance with the injector individual difference, the inter-cylinder injection quantity variation and the injector aging deterioration quantity. In this case, a correction value is calculated by proportionally dividing a sum of an ISC correction value and an FCCB correction value for each injection per combustion of multi-injection, in accordance with a total of the pilot injection quantity and the main injection quantity.

Therefore, if an injection quantity demanded by the engine in idling operation (engine-demanded injection quantity) includes an increase due to an engine load factor, the injection quantity correction value will include the increase of the engine-demanded injection quantity due to the engine load factor other than the injector individual difference, the inter-cylinder injection quantity variation and the injector aging deterioration quantity. Thus, the injection quantity correction value for each injection per combustion in the multi-injection may be erroneously corrected (erroneously learned). Accordingly, an excessive injection quantity correction value may be calculated with respect to an inherently required learning value. As a result, the excessive correction value obtained through the erroneous learning will pose problems of deterioration in the combustion noise, engine vibration, emission or the like.

SUMMARY OF THE INVENTION

It is therefore an object of the present invention to provide an injection quantity control system for an internal combustion engine capable of discriminating an injector individual difference, an inter-cylinder injection quantity variation and an injector aging deterioration quantity from change of engine-demanded injection quantity due to an engine load factor. Thus, erroneous correction of a correction value for each injection per combustion in multi-injection can be prevented.

According to an aspect of the present invention, when a predetermined operating state or a predetermined operating condition of an engine is detected, an injection frequency per combustion in multi-injection is switched to K times and a command injection quantity is divided into K times injections for each cylinder. While performing the K times divided injections, a variation in a rotation speed of each cylinder of the engine is detected. The detected value of the rotation speed variation of each cylinder is compared with an average value of rotation speed variations of all the cylinders. An injection quantity of each injection for each cylinder is individually corrected to smooth the rotation speed variations of the respective cylinders. While performing the K times divided injections, an average engine rotation speed is detected to compare with a target rotation speed set in accordance with the operating state of the engine. The injection quantity of each injection is corrected uniformly for all the cylinders to maintain the average engine rotation speed to the target rotation speed.

When the predetermined operating state or the predetermined operating condition of the engine is detected, the injection frequency per combustion in multi-injection is switched to N times and the command injection quantity is divided into N times injections for each cylinder. While performing the N times divided injections, a variation in the rotation speed of each cylinder of the engine is detected. The detected value of the rotation speed variation of each cylinder is compared with an average value of rotation speed variations of all the cylinders. The injection quantity of each injection for each cylinder is individually corrected to smooth the rotation speed variations of the respective cylinders. While performing the N times divided injections, an average engine rotation speed is detected to compare with the target rotation speed set in accordance with the operating state of the engine. The injection quantity of each injection is corrected uniformly for all the cylinders to maintain the average engine rotation speed to the target rotation speed.

When the injection frequency per combustion in multi-injection is switched to K times, a first correction value of each cylinder corresponding to a deviation between the detected value of the rotation speed variation of each cylinder and the average value of the rotation speed variations of all the cylinders is calculated. Meanwhile, a second correction value, which is uniform for all the cylinders necessary for maintaining the average engine rotation speed to the target rotation speed, is calculated. When the injection frequency per combustion in multi-injection is switched to N times, a third correction value of each cylinder corresponding to a deviation between the detected value of the rotation speed variation of each cylinder and the average value of the rotation speed variations of all the cylinders is calculated. Meanwhile, a fourth correction value, which is uniform for all of the cylinders necessary for maintaining the average engine rotation speed to the target rotational speed, is calculated.

A first injection quantity command value is calculated by adding the first correction value of each cylinder and the second correction value uniform for all of the cylinders to an injection quantity command value. The injection quantity command value is calculated in accordance with a command injection quantity set in accordance with a predetermined operating state or a predetermined operating condition of the engine and fuel injection pressure. A second injection quantity command value is calculated by adding the third correction value of each cylinder and the fourth correction value uniform for all the cylinders to the injection quantity command value. An injector individual difference, an inter-cylinder injection quantity variation, and an injector aging deterioration quantity are discriminated from a variation in an engine-demanded injection quantity based on a difference between the first injection quantity command value and the second injection quantity command value.

Thus, excessive correction of the correction value for each injection per combustion in multi-injection due to erroneous learning and erroneous correction or excessive learning and excessive correction can be prevented. Therefore, combustion noise, engine vibration or deterioration in exhaust gas performance (exhaust emission) of the engine 1 can be prevented. Furthermore, the variation in the engine-demanded injection quantity, particularly the variation in the engine-demanded injection quantity due to the engine load factor can be discriminated from the injector individual difference, the inter-cylinder injection quantity variation and the injector aging deterioration quantity. Therefore, the state in which the engine load such as electric load is applied can be detected. As a result, the injection quantity correction value (learning value) corresponding to the injector individual difference, the inter-cylinder injection quantity variation and the injector aging deterioration quantity can be calculated, without including the variation in the engine-demanded injection quantity due to the engine load factor. Thus, aimed injection quantity or injector energization pulse period can be continuously provided until the next calculation of the learning value. As a result, the engine performance deterioration is inhibited.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 11A is a diagram showing a first learning value map according to the first embodiment;

FIG. 11B is a diagram showing a second learning value map according to the first embodiment;

FIG. 12 is a diagram showing a final learning value map according to the first embodiment;

DETAILED DESCRIPTION OF THE REFERRED EMBODIMENT

First Embodiment

Figure 1:
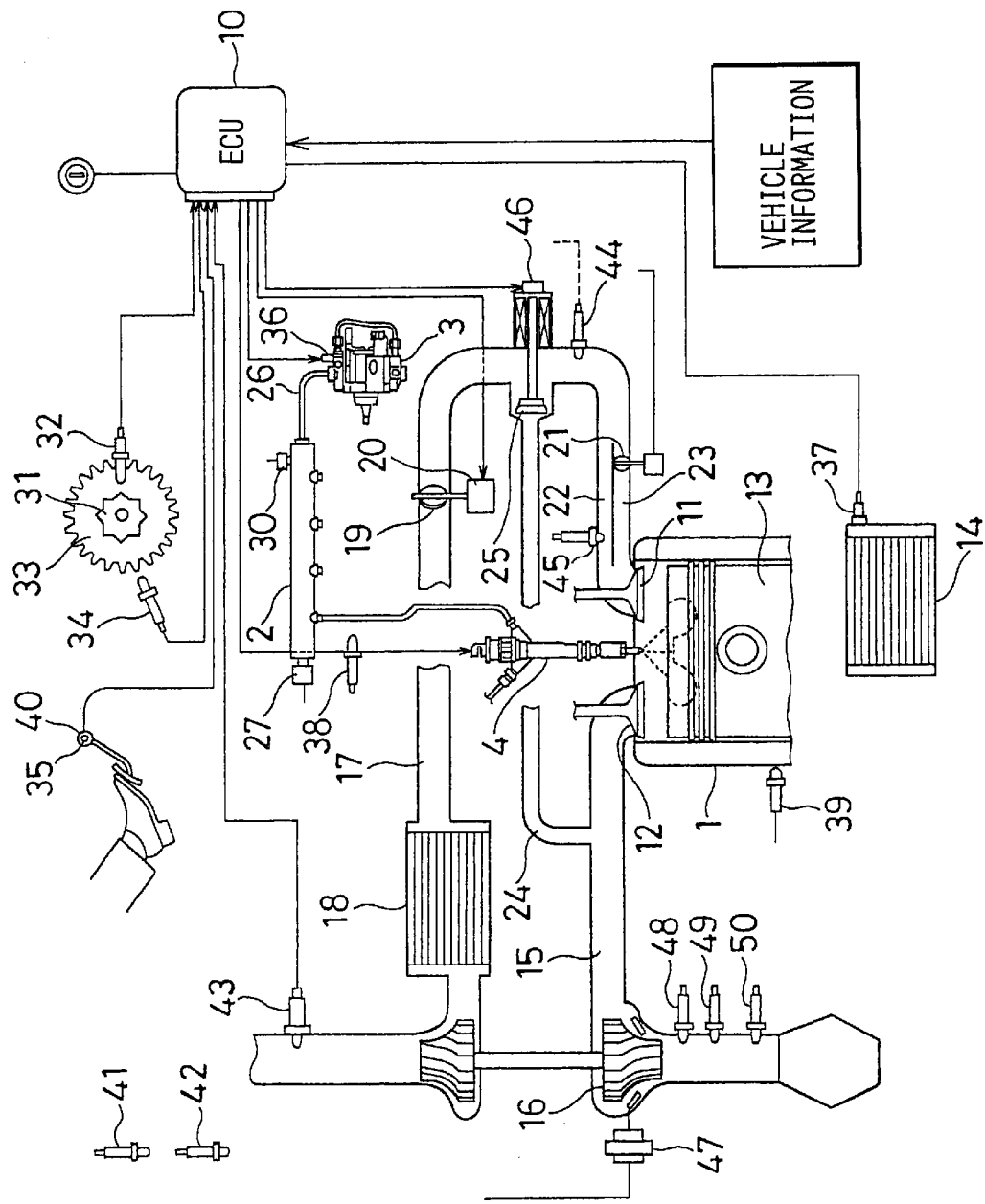
FIG. 1 is a schematic diagram showing a common rail type fuel injection system according to a first embodiment of the present invention.

Referring to FIG. 1, a common-rail type fuel injection system according to the first embodiment is illustrated.

The common-rail type fuel injection system in the first embodiment includes a common rail 2, i.e., an accumulator for storing a high-pressure fuel pressurized at a high pressure corresponding to a fuel injection pressure at which the fuel is injected into cylinders of an internal combustion engine, such as a four-cylinder diesel engine (hereinafter referred to simply as "engine"), a fuel supply pump 3, i.e., a fuel feed pump, for supplying the fuel under pressure into the common rail 2, a plurality of injectors 4 (four injectors in the embodiment) for injecting the high-pressure fuel accumulated in the common rail 2 into the cylinders of the engine 1, and an electronic control unit (hereinafter abbreviated to "ECU") 10 for electronically controlling the fuel supply pump 3 and the plurality of injectors 4.

The engine 1 is a four-stroke cycle four-cylinder engine provided with four cylinders, an oil pan and such. The cylinders of the engine 1 are defined by a cylinder block and a cylinder head. An intake port and an exhaust port formed in the cylinder head and corresponding to the cylinder are closed and opened by an intake valve 11 and an exhaust valve 12, respectively. A piston 13 is fitted for axial sliding motion in each cylinder and is connected to a crankshaft, not shown, by a connecting rod, not shown. A radiator 14 is disposed in an engine room, not shown, at a position where the radiator 14 is exposed to opposed wind. The radiator 14 is provided with a water temperature sensor 37 for measuring the temperature of cooling water for cooling the engine 1.

While the engine 1 is in operation, the exhaust gas discharged from the cylinders flows through an exhaust pipe 15, drives the turbine wheel of a variable-geometry turbocharger (VGT) 16 and is discharged through a catalyst and a muffler, not shown. The VGT 16 is controlled on the basis of signals provided by an intake pressure sensor, a boost pressure sensor 44 and a VGT position sensor 47. Compressed, high-temperature intake air is introduced into the cylinder through the intake port of the engine 1 after being cooled by an intercooler 18.

A throttle valve 19 is placed in an intake pipe 17. The throttle valve 19 adjusts the flow rate of intake air flowing through the intake pipe 17 into the engine 1. The angular position of the throttle valve 19 is adjusted by an actuator 20 controlled by a control signal provided by the ECU 10. The actuator 20 is internally provided with a throttle position sensor, not shown, for measuring the position of the throttle valve 19. The throttle position sensor may be such as capable of reporting a fully closed position of the throttle valve 19 for an idling operation and substantially fully open position of the throttle valve 19 for a high-load operation to the ECU 10.

A swirl control valve (hereinafter, abbreviated to "SCV") 21 that operates in response to a signal provided by the ECU 10 is placed in a part, near the intake port, of the intake pipe 17. The SCV 21 is placed in a bypass passage 23 bypassing an intake passage 22 provided with an intake temperature sensor 45. Power is supplied to an actuator for operating the SCV 21 to open the SCV 21 while the engine 1 operates in a high-load operating mode and supply of power to the actuator is stopped to close the SCV 21 while the engine 1 is operating in a low-load operating mode.

In this embodiment, an exhaust-gas recirculating pipe 24 is connected to the intake pipe 17 to recirculate a small part of the exhaust gas flowing through the exhaust pipe 15 to the intake pipe 17 for exhaust-gas recirculation (EGR). A valve 25 for exhaust-gas recirculation (hereinafter referred to as "EGR valve") is placed at the joint of the intake pipe 17 and the exhaust-gas recirculating pipe 24. A part of the exhaust gas flowing trough the exhaust pipe 15 is mixed into the intake air to be drawn in the cylinder to reduce the production of $NO_x$. The position of the EGR valve 25 is regulated so that the exhaust gas is mixed at an exhaust-gas recirculating rate determined according to the operating condition of the engine 1. The exhaust-gas recirculating rate (EGR rate) is controlled at a predetermined value in a feedback control mode on the basis of signals provided by an intake air flow sensor 43, the intake temperature sensor 45, an exhaust $O_2$ sensor 48 and an EGR valve position sensor 46.

The high-pressure fuel pressurized at the fuel injection pressure must be continuously accumulated in the common rail 2. The fuel supply pump pressure-feeds the high-pressure fuel through a pressure pipe 26 into the common rail 2 to accumulate the high-pressure fuel in the common rail 2. A pressure limiter 27 is placed in a relief pipe, not shown, connecting the common rail 2 to a fuel tank to prevent the rise of the pressure in the common rail 2 beyond a set limit pressure. The pressure of the fuel accumulated in the common rail 2 corresponding to the fuel injection pressure, which is called also "common rail pressure", is measured by a common rail pressure sensor 30, i.e., an injection pressure detecting means. The common rail pressure sensor 30 is a semiconductor pressure sensor provided with a sensing device, such as a piezoelectric device, mounted on a silicon substrate (circuit substrate), and capable of providing an electric signal (voltage signal) representing a fuel injection pressure.

The fuel supply pump 3 is a high-pressure pump including a feed pump, not shown, for pressure-feeding the high-pressure fuel from the fuel tank, not shown, into the common rail 2, and an electromagnetic valve, such as a suction regulating valve, for regulating the discharge of the feed pump. The fuel supply pump 3 is internally provided with a fuel temperature sensor 36 for measuring the temperature of the fuel drawn from the fuel tank.

Injectors 4 are attached to the cylinder block of the engine 1 at positions corresponding to the cylinders #1 to #4, respectively. Each of the injectors 4 is an electromagnetic fuel injection valve including an injection nozzle through which the high-pressure fuel is injected into the corresponding cylinder, an actuator such as an electromagnetic valve for moving a nozzle needle placed in the fuel injection nozzle in an opening direction, and biasing means such as a spring for urging the nozzle needle in a closing direction.

The injector 4 injects the high-pressure fuel accumulated in the common rail 2 into the corresponding cylinder of the engine 1, for example, while the electromagnetic valve is open. The fuel leaked from the injector 4 or the fuel discharged from a back pressure control chamber for controlling back pressure applied to the nozzle needle (return fuel) is returned through a fuel return passage to the fuel tank. When valve opening time of the electromagnetic valve of the injector 4 is increased, fuel injection quantity, i.e., the quantity of fuel injected into the cylinder, increases accordingly, and vice versa.

The ECU 10 is provided with a microcomputer of a generally known architecture, which includes a CPU for carrying out control operations and arithmetic operations, a storage device, such as a ROM, a standby RAM, an EEPROM or a RAM, for storing programs and data, an input circuit, an output circuit, a power circuit, an injector driving circuit, a pump driving circuit and such. A voltage signal provided by the common rail pressure sensor 30 and sensor signals provided by other sensors are processed for A/D conversion by an A/D converter, the A/D converter gives digital signals corresponding to the input sensor signals to the microcomputer of the ECU 10. When the engine key is returned to an IG position to close the ignition switch after cranking the engine 1, actuators for operating the component parts including the fuel supply pump 3 and the injectors 4 are controlled electronically.

A cylinder identifying means included in this embodiment includes a signal rotor 31 mounted on the camshaft of the engine 1, capable of turning once while the crankshaft of the engine 1 turns two times, and provided on its circumference with teeth (projections) respectively corresponding to the cylinders, and an electromagnetic sensor 32, i.e., a cylinder identifying sensor, that generates a pulse G every time one of the teeth moves past the electromagnetic sensor 32.

An engine rotation speed sensor of this embodiment includes a signal rotor 33 mounted on the crankshaft of the engine 1, capable of turning once while the crankshaft of the engine 1 turns once, and provided on its circumference with crank angle indicating teeth (projections), and a crank angle sensor (electromagnetic sensor) 34 that generates an NE pulse every time one of the crank angle indicating teeth moves past the electromagnetic sensor 34. The crank angle sensor 34 provides a plurality of NE pulses while the signal rotor 33 turns once, i.e., while the crankshaft turns once. The specific NE pulses correspond to the top dead centers TDCs of the pistons of the cylinders #1 to #4, respectively. The ECU 10 measures intervals between the NE pulses to measure engine rotation speed NE.

The ECU 10 includes a function of a stable idling state detecting means for detecting a low-load low-speed state, i.e., no-load fuel consumption state (stable idling state) when a state where the engine rotation speed NE is not higher than a predetermined value of, for example, 1000 rpm, acceleration position ACCP is not greater than a predetermined value of, for example, 0%, running speed SPD of the vehicle is not higher than a predetermined value of, for example, 0 km/h, command injection quantity QFIN is not greater than a predetermined value of, for example, 5 $mm^3$/st, and a transmission is set in neutral (N) is detected.

The ECU 10 includes a discharge controlling means for calculating an optimum fuel injection pressure, i.e., an optimum common rail pressure, which is most desirable for the operating condition of the engine 1 and for driving the electromagnetic valve of the fuel supply pump 3 through the pump driving circuit. The ECU 10 calculates a target fuel pressure PFIN in accordance with the engine rotation speed NE and the command injection quantity QFIN. The ECU 10 adjusts a pump-driving signal (driving current) for driving the electromagnetic valve of the fuel supply pump 3 to control the discharge of the fuel supply pump 3 such that the working fuel injection pressure coincides with the target fuel pressure PFIN.

More preferably, to improve the accuracy of control of fuel injection quantity, it is desirable to control the pump driving signal for driving the electromagnetic valve of the fuel supply pump 3 in a feedback control mode so that the fuel injection pressure (actual common rail pressure: NPC) measured by the common rail pressure sensor 30 coincides with the target fuel pressure PFIN determined in accordance with the operating conditions of the engine 1. Desirably, the driving current SCV supplied to the electromagnetic valve is controlled by a duty cycle control method; that is, accurate digital control can be carried out by using the duty ratio control for changing a valve opening degree of the electromagnetic valve of the supply pump 3 by controlling an ON/OFF ratio of the pump driving signal per unit time (energization period ratio, duty ratio) in accordance with a pressure deviation between the common rail pressure NPC and the target fuel pressure PFIN.

Figure 2:
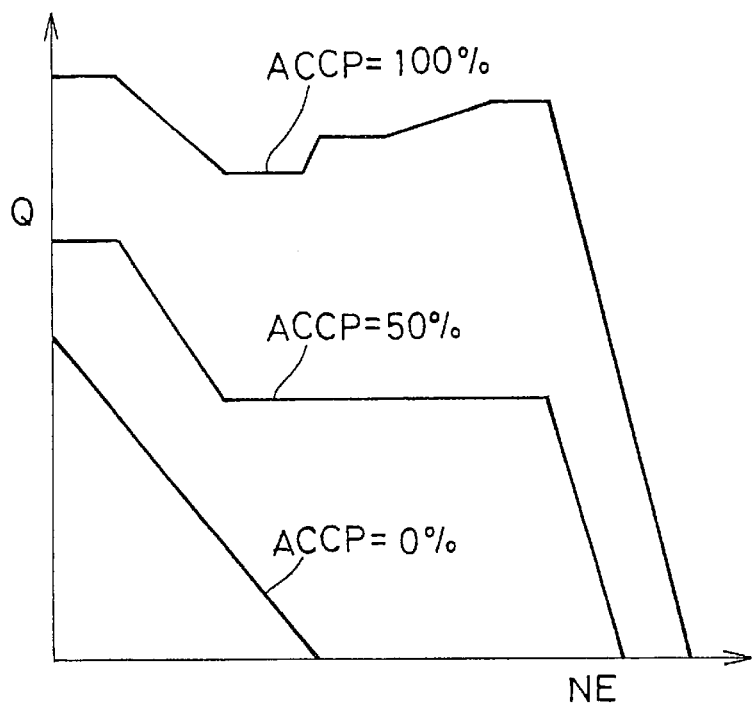
FIG. 2 is a characteristic diagram for calculating a basic injection quantity according to the first embodiment.
Figure 3:
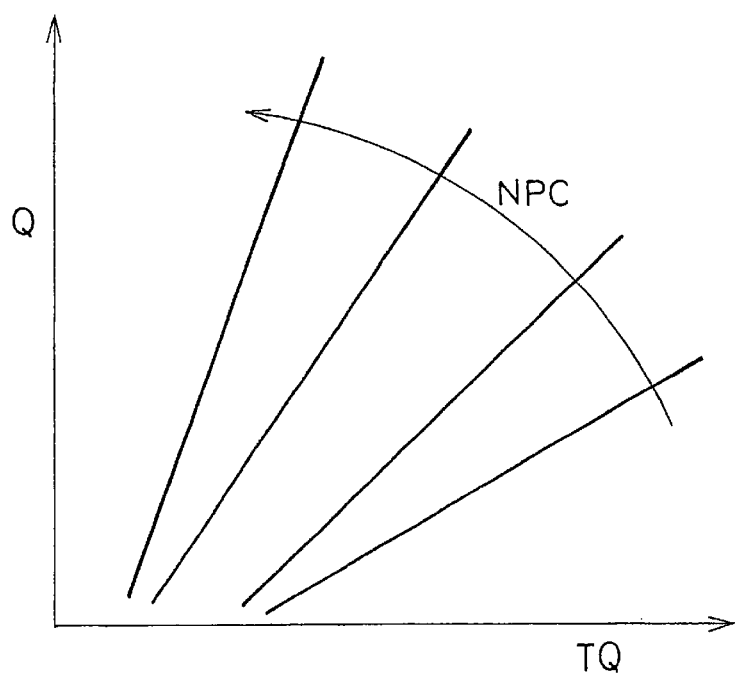
FIG. 3 is a characteristic diagram for calculating an injection command pulse period according to the first embodiment.
Figure 4:
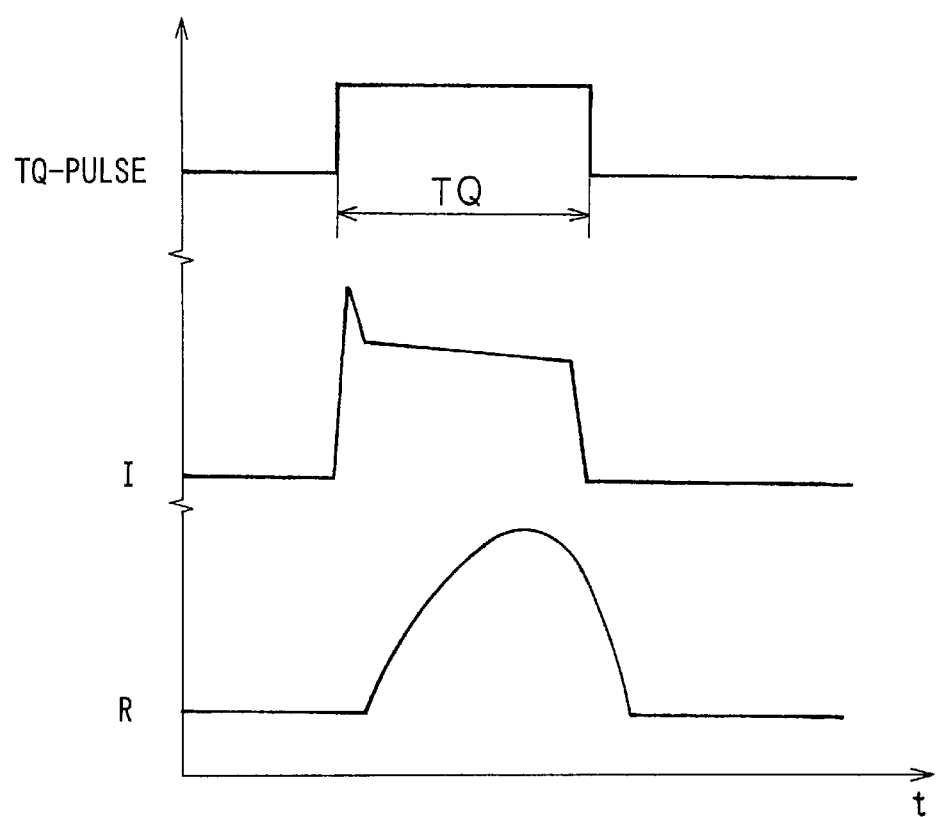
FIG. 4 is a timing chart showing an injector injection command pulse (TQ pulse), an injector drive current waveform and a fuel injection rate according to the first embodiment.

The ECU 10 serves also as an injection quantity controlling system for an internal combustion engine capable of individually controlling fuel injection quantities to be injected into the cylinders by the injectors 4. The ECU 10 includes a basic injection quantity determining means, a command injection quantity determining means, an injection period determining means, and an injector driving means. The basic injection quantity determining means calculates an optimum demand injection quantity (basic injection quantity Q) in accordance with the engine rotation speed NE and the acceleration position ACCP based on a characteristic map (FIG. 2) produced beforehand on the basis of experimental data. The command injection quantity determining means calculates the command injection quantity QFIN by tempering the basic injection quantity Q with an injection quantity correction value determined on the basis of operating conditions including a fuel temperature THF measured by the fuel temperature sensor 36 and a cooling water temperature THW measured by the water temperature sensor 37. The injection period determining means calculates a command injection period (injection command pulse period, injector energization pulse period: TQ) in accordance with the common rail pressure NPC and the command injection quantity QFIN based on a characteristic map (FIG. 3) produced beforehand on the basis of experimental data. In FIG. 3, the common rail pressure increases along an arrow mark. The injector driving means applies pulse-like injector driving pulse currents (injector injection command pulses, TQ pulses) through the injector driving circuit EDU to the electromagnetic valves of the injectors 4. FIG. 4 is a time chart showing an injection command pulse period (injection quantity command value: TQ) for a specific cylinder, for example the cylinder #1, the waveform I of an injector driving current supplied to the electromagnetic valve of the injector 4 for the cylinder #1 according to the injection command pulse period, and a fuel injection rate R.

In the embodiment, the basic injection quantity Q, the injection period T and the target fuel pressure PFIN are calculated in accordance with data provided by operating condition detecting means for detecting the operating conditions of the engine 1, including the crank angle sensor 34, i.e., an engine rotation speed sensor, and the accelerator position sensor 35. The basic injection quantity Q, the injection period T and the target fuel pressure PFIN may be tempered for correction with the fuel injection pressure NPC measured by the common rail pressure sensor 30 or with detection signals (data on the operating conditions of the engine) provided by other sensors for detecting the operating conditions, such as the fuel temperature sensor 36, the water temperature sensor 37, a leak fuel temperature sensor 38, an oil temperature sensor 39, an idling accelerator position sensor 40, an atmospheric pressure sensor 41, an atmospheric temperature sensor (ambient temperature sensor) 42, an intake air quantity sensor 43, the boost pressure sensor 44, an intake temperature sensor 45, the EGR valve position sensor 46, the VGT position sensor 47, the exhaust $O_2$ sensor 48, an exhaust temperature sensor 49, an exhaust pressure sensor 50, a throttle position sensor, an intake pressure sensor, an injection period sensor and such.

The ECU 10 is connected with a starting circuit through which a current is supplied to a starter motor when the ignition key is inserted in a key cylinder and turned to a start position ST to close a starting switch. The ECU 10 receives signals indicating the conditions of the vehicle, such as a signal indicating a gear position of the transmission driven by the engine 1, a signal indicating the depression of the clutch pedal, a signal indicating the supply of a current to the starting motor, a speed signal provided by a vehicle speed sensor, signals indicating electrical loads including electromagnetic cutch included in an air conditioning system, an electric fan for a condenser included in the air conditioning system, a fan for blowing air into the passenger compartment, included in the air conditioning system, an electric fan for the radiator and head lamps, and signals indicating mechanical loads including a compressor included in the air conditioning system and an oil pump included in a power steering system.

In the common rail type fuel injection system in this embodiment, the injector 4 for each cylinder is capable of performing a multi-injection including two or more injections, for instance, a plurality of pilot injections and a main injection, during one combustion stroke of each cylinder of the engine 1 while the crankshaft of the engine 1 rotates two times (through an angle of 720° CA) for one four-stroke cycle including a suction stroke, a compression stroke, an expansion stroke (combustion stroke) and an exhaust stroke.

The ECU 10 is provided with an injection quantity determining means, an interval determining means, and an injection period determining means. The injection quantity determining means calculates injection quantities for the injections of the multi-injection, i.e., a pilot injection quantity and main injection quantity, on the basis of the operating condition of the engine 1 (information about the operation of the engine) and the basic injection quantity. The interval determining means calculates an interval between a pilot injection and a main injection on the basis of engine rotation speed and pilot injection quantity and an interval between pilot injections on the basis of engine rotation speed and pilot injection quantity. The injection period determining means calculates a pilot injection period on the basis of pilot injection quantity and fuel pressure and a main injection period on the basis of main injection quantity and fuel pressure.

The ECU 10 in this embodiment executes a rotation speed variation inter-cylinder injection quantity correction (FCCB correction). In the FCCB correction, the ECU 10 measures engine rotation speed variations in the expansion strokes of the cylinders of the engine 1 while the engine 1 is in the stable idling state. Then, the ECU 10 compares the measured engine rotation speed variation of each cylinder of the engine 1 with an average value of the engine rotation speed variations of all the cylinders. Then, the ECU 10 sets optimum fuel injection quantities individually for the cylinders so as to equalize the engine rotation speed variations of all the cylinders.

More specifically, time intervals between pulses of the NE signals provided by the crank angle sensor 34 are measured and an instantaneous engine rotation speed during the expansion stroke of each cylinder of the engine 1 is calculated. The maximum one of the time intervals between the pulses of the NE signal in the angular range of BTDC (before TDC) 90° CA (crank angle) and ATDC (after TDC) 90° CA is regarded as the lowest engine rotation speed Nl of the instantaneous engine rotation speed for the cylinder. The minimum one of the time intervals between the pulses of the NE signal in the angular range of BTDC 90° CA and ATDC 90° CA is regarded as the highest engine rotation speed Nh of the instantaneous engine rotation speed for the cylinder. A low engine rotation speed and a high engine rotation speed representing the variation of the engine rotation speed for the cylinder may be used instead of the lowest engine rotation speed Nl and the highest engine rotation speed Nh.

The foregoing calculating operations are performed for all the cylinders and the difference $\Delta Nk$ between the highest engine rotation speed Nh and the lowest engine rotation speed Nl is calculated. Thus, a measured value $\Delta Nk$ representing the, variation of the engine rotation speed for each cylinder of the engine 1 is calculated. Then, the average engine rotation speed variation $\Sigma \Delta Nk$ of the engine rotation speed variations $\Delta Nk$ of all the cylinders is calculated; that is, the engine rotation speed variations $\Delta Nk$ of all the cylinders of the engine 1 are averaged, the average engine rotation speed variation $\Sigma \Delta Nk$ is calculated, and the deviations of the engine rotation speed variations $\Delta Nk$ of all the cylinders from the average engine rotation speed variation $\Sigma \Delta Nk$ are calculated. Then, a first or third correction value (FCCB correction value) for equalizing the engine rotation speed variations is added to the calculated injection quantity individually for each cylinder.

The ECU 10 in this embodiment carries out an average engine rotation speed correction (ISC correction) to adjust the average idling rotation speed to a target idling rotation speed during the stable idling operation. The ISC correction is performed for all the cylinders to reduce the deviation $\Delta NE$ of the average engine rotation speed with respect to the target engine rotation speed. In the ISC correction, the fuel injection quantity is uniformly increased by 1 $mm^3$/st in all of the cylinders at an interval at a predetermined time interval of, for example, 50 through 70 msec. The ISC correction is performed continuously for a predetermined period or until an ISC correction value (QISC) is stabilized, that is, until the average engine rotation speed substantially coincides with target engine rotation speed.

More specifically, the ECU 10 compares the actual engine rotation speed NE with the target speed (target idling rotation speed, ISC target NE) and calculates a second or fourth injection quantity correction value (also referred to as ISC correction value, hereafter) in accordance with the difference between the engine rotation speed NE and the target idling rotation speed. Then, the ECU 10 adds the ISC correction value to the injection quantity of each injection corrected by the FCCB correction value, which is calculated for each cylinder, uniformly for all of the cylinders such that the average engine rotation speed substantially coincides with the target idling rotation speed. Alternatively, the ECU 10 adds an injector energization pulse period correction value (injection command pulse period correction value) to the injection quantity uniformly for all of the cylinders. The ISC correction value or the injection command pulse period correction value is the quantity required for equalize the actual engine rotation speed NE with the target idling rotation speed.

Next, learning control of pilot injection quantity in this embodiment will be explained based on a flowchart shown in FIG. 5. A control routine shown in FIG. 5 is repeated at predetermined time intervals after the ignition switch has been closed.

Figure 5:
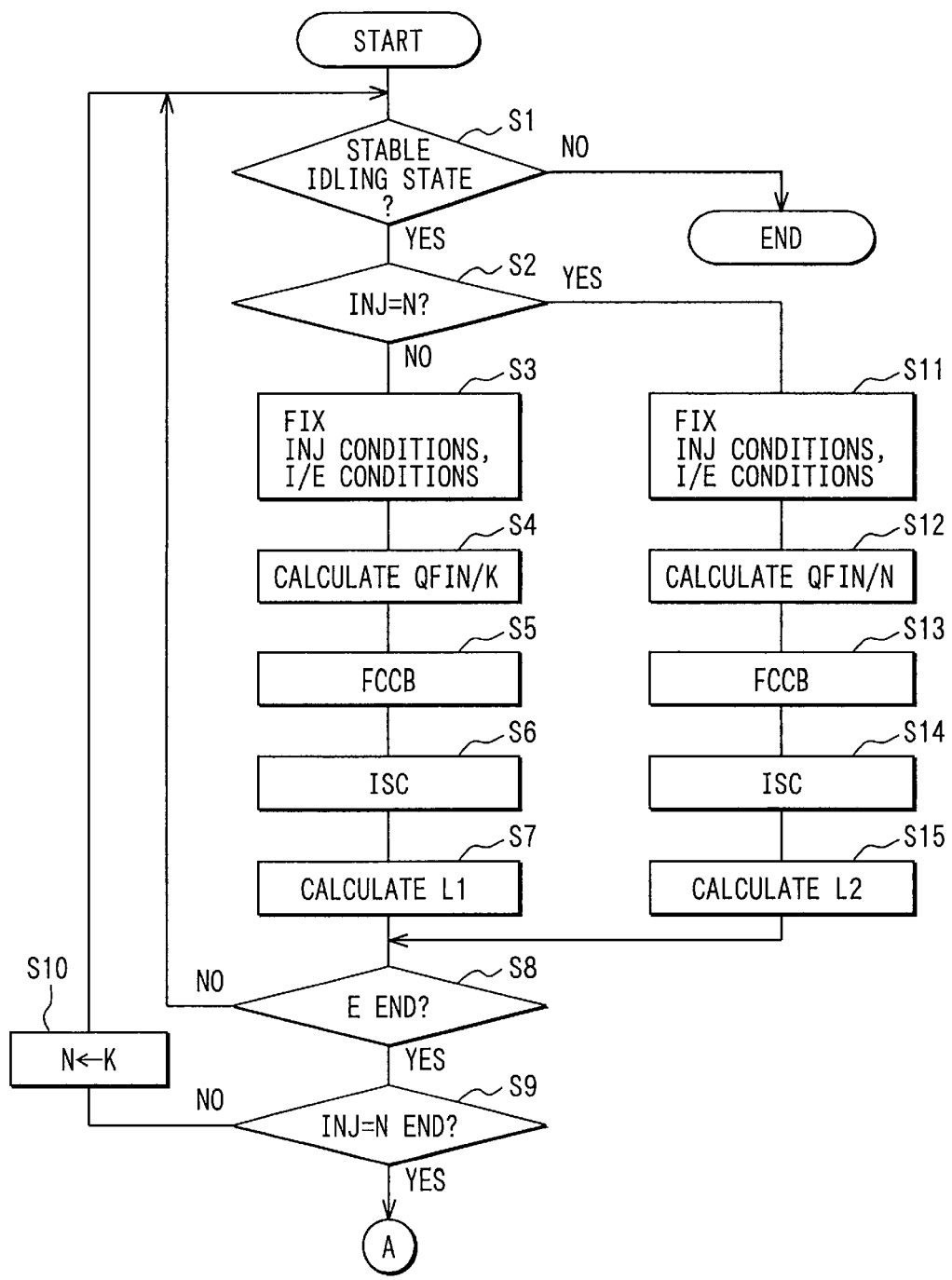
FIG. 5 is a flowchart showing a pilot learning control method according to the first embodiment.

At time to start the control routine shown in FIG. 5, it is determined whether a pilot learning execution conditions are established (ON) in Step S1. That is, it is determined whether the engine 1 is in the stable idling operation in Step S1. The control routine is ended if the result of the determination in Step S1 is "NO".

(1) Signals provided by the sensors and switches connected to the engine 1 or attached to the vehicle and capable of detecting operating conditions of the engine 1 are examined to see if the engine 1 is in the stable idling operation. For instance, the combustion state of the engine 1 is determined to be the stable idling state if the state in which the engine rotation speed NE is not greater than a predetermined value (for instance, 1000 rpm), the accelerator position ACCP is not greater than a predetermined value. (for instance, 0%), running speed of the vehicle SPD is not greater than a predetermined value (for instance, 0 km/h), the command injection quantity QFIN is not greater than a predetermined value (for instance, 5 $mm^3$/st) or the gear position of the transmission is at N (neutral) is detected.

(2) Signals provided by sensors connected to the engine 1 or attached to the vehicle and capable of detecting environmental conditions are examined to see if the signals are in ranges determined beforehand to make idling no load fuel consumption coincide with an expected value.

(3) Signals provided by the sensors and switches connected to the engine 1 or attached to the vehicle and capable of detecting the loaded state of the engine 1 or control command values are examined to see if the increase in the engine-demanded injection quantity due to the load on the engine 1 is in a predetermined range. Those sensors, switches and control command values include switches and sensors capable of detecting the electric loads of the electric fan for the radiator, an electric heater, the head lamps and the electromagnetic brakes, switches and sensors capable of detecting loads of the air conditioning system, the compressor. included in the power steering system and the pumps, and changes in ISC injection quantity necessary for maintaining a change in idling rotation speed or idling rotation speed at a predetermined value.

(4) Lastly, it is confirmed that the injection quantity command value, the FCCB correction value, the ISC correction value, the fuel injection pressure and the injection period command value indicating that the idling rotation speed is stable are in predetermined ranges. It is decided that the pilot learning execution conditions are established (ON) when conditions stated in (1) to (4) are satisfied and pilot learning execution inhibiting conditions are not established.

Figures 6, 7:
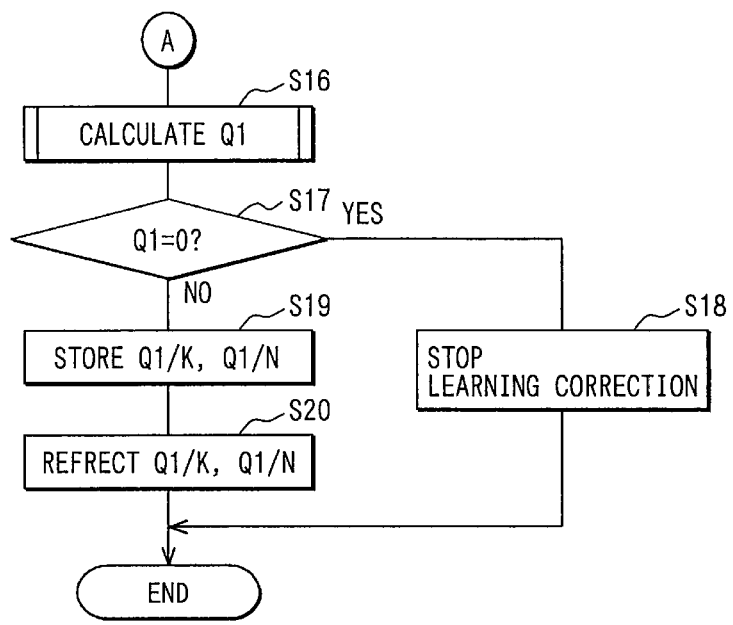
FIG. 6 is a flowchart showing the pilot learning control method according to the first embodiment.
FIG. 7 is a diagram showing an injection pattern of equally divided injection according to the first embodiment.

If the result of the determination in step S1 is "YES", that is, if the pilot learning execution condition is established (ON), it is determined whether an injection frequency (multi-injection frequency: INJ) per combustion in multi-injection is N times or not in step S2. If the result of the determination in Step S2 is "NO", in order to fix a combustion state (injection conditions, intake and exhaust conditions) of the engine 1, the target fuel pressure PFIN is firstly set to A MPa as shown in FIG. 7. At that time, the pump driving signal (driving current value) to the electromagnetic valve of the supply pump 3 is controlled in accordance with a pressure deviation between the common rail pressure NPC detected by the common rail pressure sensor 30 and the target fuel pressure PFIN.

For instance, an ON/OFF ratio of the pump driving signal per unit time (energization period ratio, duty ratio) is controlled in accordance with the pressure deviation between the common rail pressure NPC and the target fuel pressure PFIN to change the valve opening degree of the electromagnetic valve of the supply pump 3. Thus, the common rail pressure NPC is feedback-controlled substantially to the target fuel pressure PFIN by controlling a pressurizing quantity of fuel discharged from the supply pump 3 (pump discharge quantity).

In the embodiment, then, the target fuel pressure PFIN is successively set to B MPa thorough E MPa. Thus, the common rail pressure is changed from one pressure level A corresponding to a low fuel injection pressure in a normal stable idling state to other pressure level E corresponding to a fuel injection pressure different from that of the normal stable idling state.

Then, in Step S3, injection conditions (INJ conditions) and intake/exhaust conditions (I/E conditions) are fixed. More specifically, the injection frequency INJ per combustion in the multi-injection is set to K times (for instance, 5 times). Meanwhile, respective intervals of the multi-injection during the pilot learning control are set. Meanwhile, command injection timing of K times injections (injection timing: TFIN) are set to vicinities of the top dead center position (TDC). Meanwhile, the target rotation speed $NE_t$ of the ISC correction is set to 750 rpm. Meanwhile, a supercharge pressure target value $P_s$ and the EGR quantity are set to null (EGR cut) and the valve opening degree of the throttle valve (THR) 19 and the valve opening degree of SCV 21 are fixed.

Then, in Step S4, the injection quantity command value per combustion in the multi-injection, in which the injection quantity is divided generally equally to K times injections, is calculated. As shown by Expression (1), the injection quantity command value is a pilot injection quantity corresponding to 1/K of total injection quantity totalQ, or a quantity produced by substantially equally dividing the command injection quantity QFIN by the multi-injection frequency (K times). The command injection quantity QFIN is calculated by adding the injection quantity correction value, which is calculated in consideration of the engine cooling water temperature, the fuel temperature and the like, to the basic injection quantity Q. The basic injection quantity Q is calculated with a characteristic map shown in FIG. 2, which is made by measuring a relationship between the engine rotation speed NE and the accelerator position ACCP previously through experimentation, or with a formula. More specifically, the injection quantity command value is the pilot injection quantity corresponding to 1/K of a no load fuel consumption Qidle. The no load fuel consumption Qidle is the injection quantity command value used when the engine 1 is in the stable idling operation. In the embodiment, if the total injection quantity totalQ in the stable idling operation is set to 5 $mm^3$/st and the multi-injection frequency K is set at 5 times, the pilot injection quantity is 1 $mm^3$/st.

(pilot injection quantity)=(*Qidle*)/*K*+(preceding learning value)×
   (correction value)=(*totalQ*)/*K*+(preceding learning value)×(correction value)     Expression (1)

Figure 8:
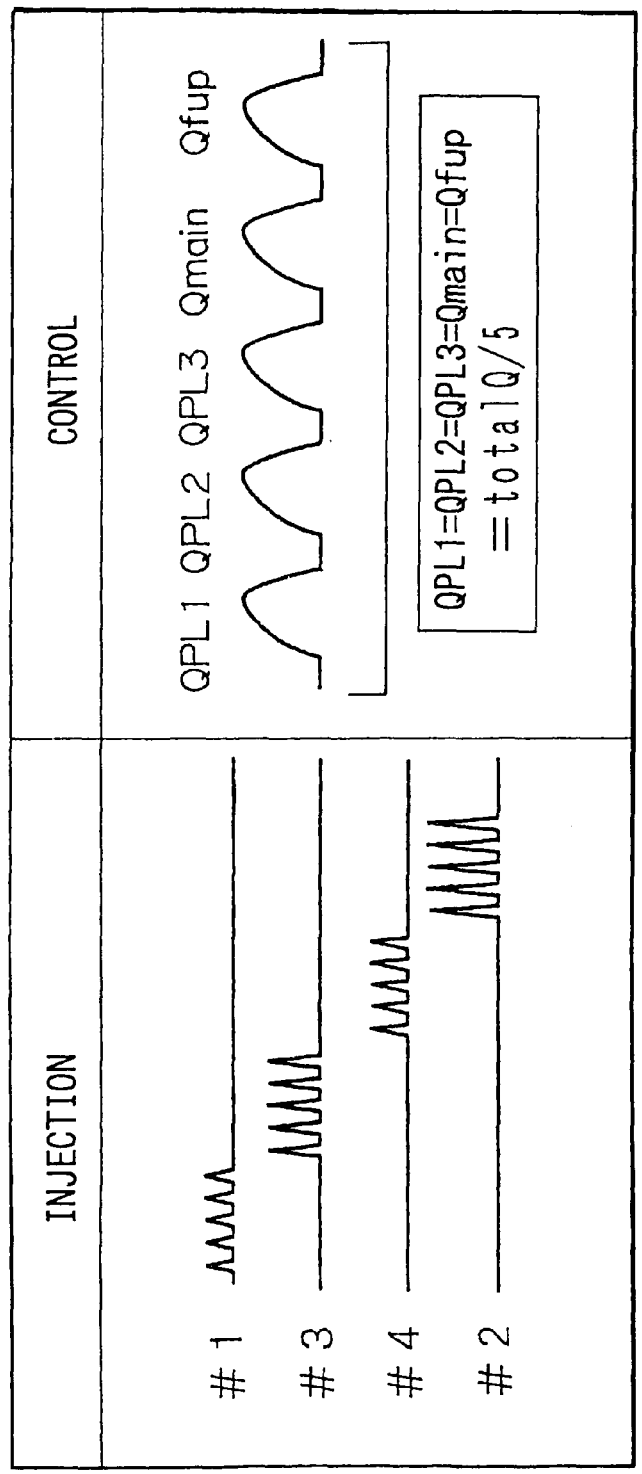
FIG. 8 is a diagram showing injection behavior and an outline of a control content according to the first embodiment.

As shown in FIG. 8 and expressed by Expression (2), each injection quantity command value: QPL1=QPL2=QPL3=Qmain=Qfup=totalQ/K may be corrected taking into consideration the influence of intervals between injections, the influence of pressure in the cylinder dependent on injection timing and the influence of fuel injection pressure (common rail pressure) so that the equal injection quantities of fuel is injected in the K injections, respectively.

(Pilot injection quantity)=*Qidle*/*K*+*QPLCPQ*+*QINT*+(Preceding learning value)×(Correction value)     Expression (2)

In Expression (2), Qidle is a value retrieved from a characteristic map made in advance by measuring the relations among the engine rotation speed NE, the accelerator position ACCP and the basic injection quantity Q through experimentation or is calculated with a formula. QPLCPQ is a cylinder inner pressure correction coefficient. QINT is an interval-dependent correction coefficient. QPLCPQ AND QINT may be correction values for an injection period (injector energization pulse period correction value) instead of correction values for injection quantity.

Figure 9:
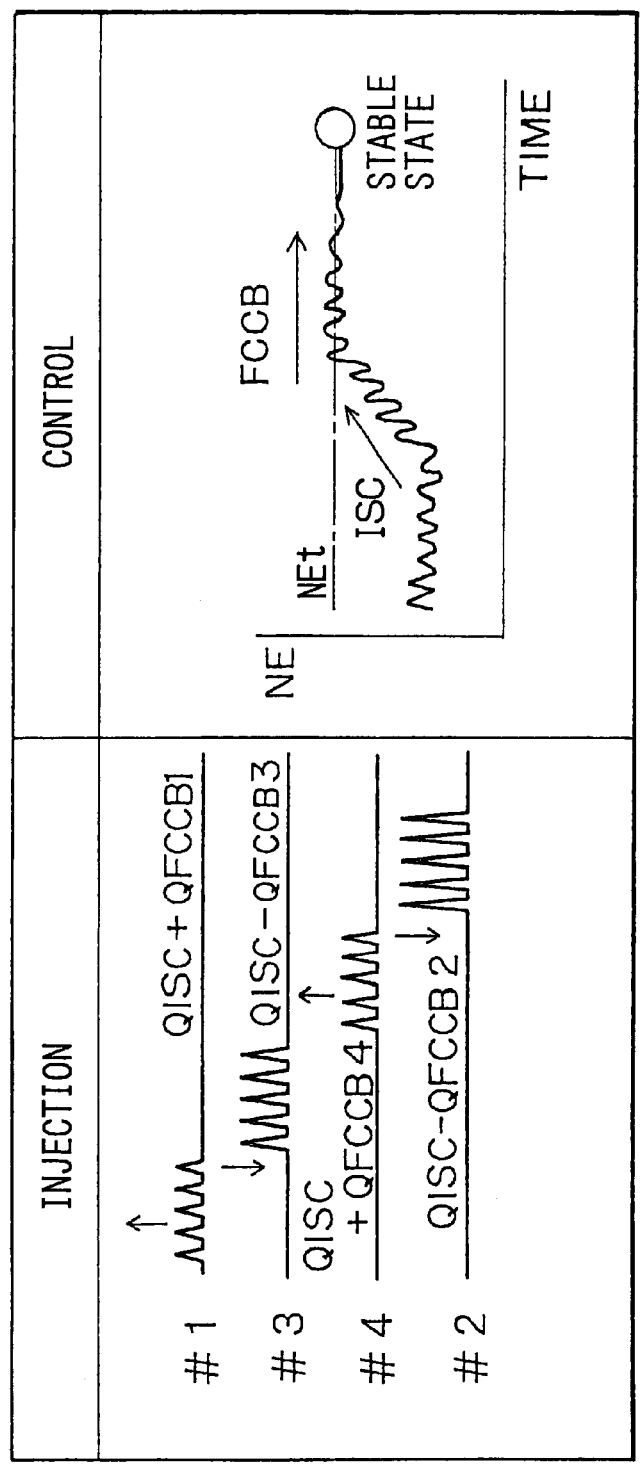
FIG. 9 is a diagram showing injection behavior and an outline of a control content according to the first embodiment.

Referring to FIG. 9, the FCCB correction for adjusting fuel injection quantities for the cylinders of the engine 1 in accordance with the differences among the rotation speed variations of the cylinders (inter-cylinder engine rotation speed variation differences) is executed so that the inter-cylinder engine rotation speed variation differences are reduced in Step S5. In the FCCB correction in Step S5, a first injection quantity correction value (FCCB correction value: QFCCB) is individually added to each injection quantity command value per combustion in the multi-injection. The FCCB correction value for each cylinder is divided into K equal divided correction values QFCCB/K, and the divided correction value QFCCB/K is reflected in each pilot injection quantity, which corresponds to 1/K of the no load fuel consumption Qidle.

As shown in FIG. 9, in Step S6, the ISC correction is executed for all the cylinders to adjust the average engine rotation speed NE of the cylinders to the target engine rotation speed $NE_t$, and an identical second injection quantity correction value (ISC correction value: QISC) for adjusting the engine rotation speed to the target engine rotation speed is added to the FCCB correction values (QFCCB/K) uniformly for all the cylinders. The ISC correction value QISC is divided into equal K divided correction values QISC/K, and the divided correction values QISC/K are reflected in the sum of the pilot injection quantity Qidle/K equal to 1/K of the no load fuel consumption Qidle and the divided FCCB correction value QFCCB/K uniformly for all the cylinders.

Figure 10:
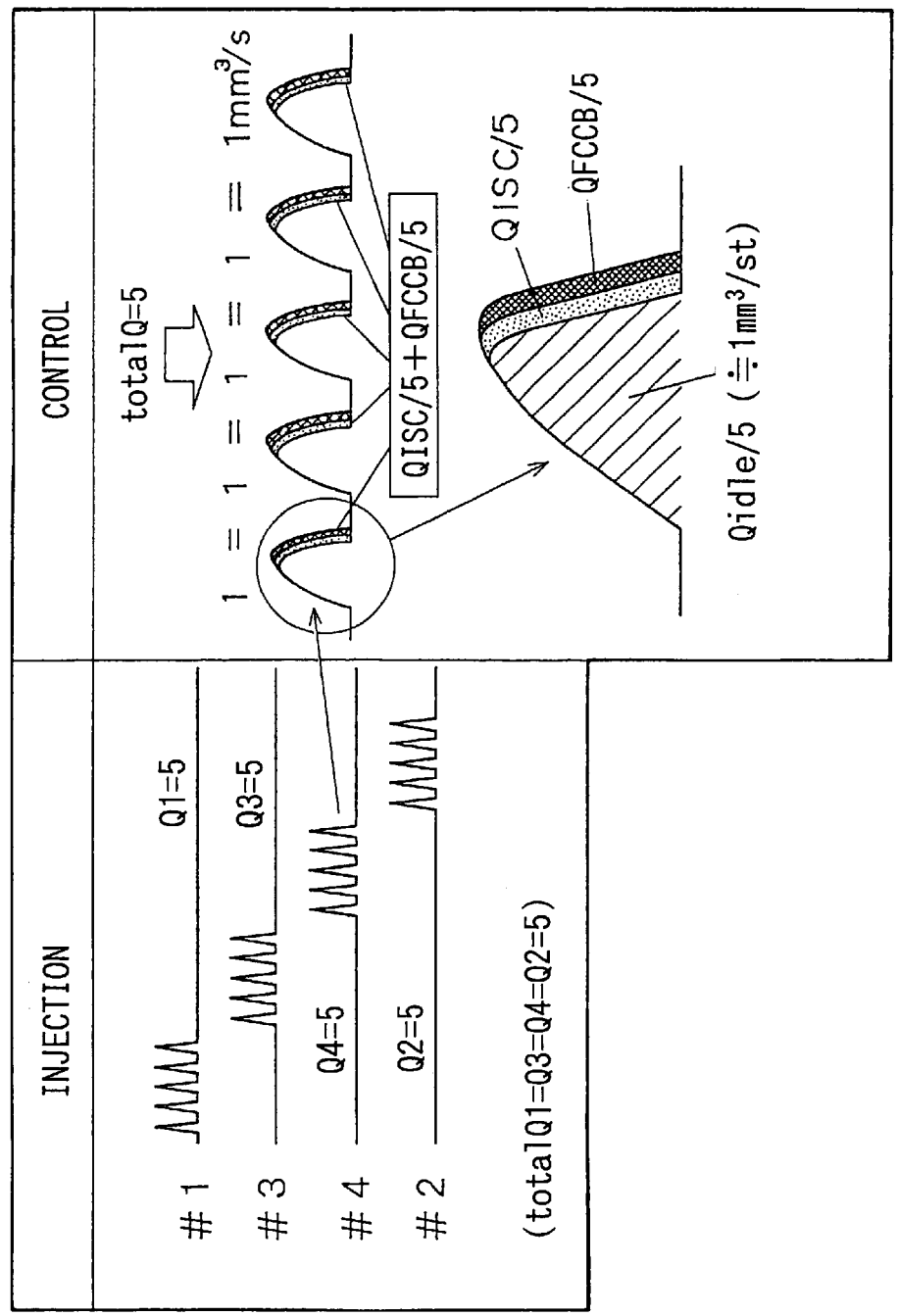
FIG. 10 is a diagram showing injection behavior and an outline of a control content according to the first embodiment.

Then, in Step S7, a present first learning value L1 is calculated as shown in FIG. 10. The present learning value L1 is calculated from the divided FCCB correction value QFCCB/K obtained in Step S5 and the divided ISC correction value QISC/K obtained in Step S6 based on Expression (3). The first learning value L1 is calculated for each cylinder and each target fuel pressure PFIN. The first learning value L1 is written into a first learning value map shown in FIG. 11A, and is temporarily stored in the memory such as stand-by RAM or EEPROM.

$$L1 = QFCCB/K + QISC/K + (\text{Preceding } L1) = (QISC + QFCCB)/K + (\text{Preceding } L1) \quad \text{Expression (3)}$$

The present first learning value L1 is calculated as an injection quantity correction value at the common rail pressure of the present pressure level to be added to the divided injection quantity command value totalQ/K of the divided no load fuel consumption Qidle/K for each injection. Alternatively, the present first learning value L1 may be an energization pulse period correction value for the TQ pulse. Then, in Step S8, it is determined whether calculation of the first learning value L1 or a second learning value L2 for the respective target fuel pressures (common rail pressures) corresponding to all of the pressure levels, which are previously set, has been finished. More specifically, it is determined whether calculation of the first learning value L1 or the second learning value L2 at the target fuel pressure PFIN of E MPa has been finished in Step S8. If the result of the determination in Step S8 is "NO", the processing proceeds to Step S1. Then, without changing the injection conditions or the intake/exhaust conditions of the engine 1 at Step S3 or Step S11, only the target fuel pressure (common rail pressure) is changed from a preceding pressure level to a succeeding pressure level (for instance, A→B, B→C, C→D, D→E). Then, from Step S4 or Step S12, the pilot injection learning control is executed again. Thus, the first learning value L1 or the second learning value L2 for each cylinder is calculated at the target fuel pressure (common rail pressure) of the succeeding pressure level is calculated from the ISC correction value and the FCCB correction value.

If the result of the determination in Step S8 is "YES", the processing proceeds to Step S9. In Step S9, it is determined whether N times injections per combustion in the multi-injection has been finished. If the result of the determination in Step S9 is "NO", the injection frequency per combustion in the multi-injection (multi-injection frequency) is changed from K times to N times in Step S10. Then, learning control is repeated again from Step S1.

If the result of determination in Step S2 is "YES", the injection frequency INJ per combustion in the multi-injection (multi-injection frequency: INJ) is set to N times (for example, 3 times or 7 times) in Step S11. Meanwhile, in order to equalize the learning correction conditions to that of K times injection, the combustion state (injection conditions, intake/exhaust conditions) of the engine 1 is fixed in Step S11 as shown in FIG. 7.

Then, in Step S12, the injection quantity command value per combustion in the multi-injection, in which the injection quantity is divided generally equally to N times injections, is calculated. As shown by Expression (4), the injection quantity command value is a pilot injection quantity corresponding to 1/N of total injection quantity totalQ, or a quantity produced by substantially equally dividing the command injection quantity QFIN by the multi-injection frequency (N times). The command injection quantity QFIN is calculated by adding the injection quantity correction value, which is calculated in consideration of the engine cooling water temperature, the fuel temperature and the like, to the basic injection quantity Q. The basic injection quantity Q is calculated with a characteristic map shown in FIG. 2 or with a formula. More specifically, the injection quantity command value is the pilot injection quantity corresponding to 1/N of the no load fuel consumption Qidle.

$$\text{(pilot injection quantity)} = (Qidle)/N + (\text{preceding learning value}) \times (\text{correction value}) = (totalQ)/N + (\text{preceding learning value}) \times (\text{correction value}) \quad \text{Expression (4)}$$

Then, the FCCB correction for adjusting fuel injection quantities for the cylinders of the engine 1 in accordance with the inter-cylinder engine rotation speed variation differences is executed so that the inter-cylinder engine rotation speed variations are equalized in step S13. In the FCCB correction in Step S13, a third injection quantity correction value (FCCB correction value QFCCB) is added to each injection quantity command value per combustion in the multi-injection. The FCCB correction value for each cylinder is divided into N equal divided correction values QFCCB/N, and the divided correction value QFCCB/N is reflected in each pilot injection quantity, which corresponds to 1/N of the no load fuel consumption Qidle.

Then, in Step S14, the ISC correction is executed for all the cylinders to adjust the average engine rotation speed NE of all the cylinders to the target engine rotation speed $NE_t$, and an identical fourth injection quantity correction value (ISC correction value QISC) for adjusting the engine rotation speed NE to the target engine rotation speed $NE_t$ is added to the divided FCCB correction value (QFCCB/N) uniformly in all the cylinders. The ISC correction QISC is divided into equal N divided correction values QISC/N, and the divided correction value QISC/N is reflected in the sum of the command injection quantity Qidle/N equal to 1/N of the no load fuel consumption Qidle and the divided FCCB correction value QFCCB/N uniformly in all the cylinders.

Then, the present second learning value L2 is calculated in step S15 as shown in FIG. 10. The present second learning value L2 is calculated from the divided FCCB correction value QFCCB/N obtained in Step 13 and the divided ISC correction value QISC/N obtained in Step S14 based on Expression (5). The second learning value L2 is calculated for each cylinder and each target fuel pressure PFIN. The second learning value L2 is written into a second learning value map shown in FIG 11B, and is temporarily stored in the memory such as the stand-by RAM or the EEPROM.

$$L2 = QFCCB/N + QISC/N + (\text{Preceding } L2) = (QISC + QFCCB)/N + (\text{Preceding } L2) \quad \text{Expression (5)}$$

The present second learning value L2 is calculated as an injection quantity correction value at the common rail pressure of the present pressure level to be added to the divided injection quantity command value totalQ/N of the divided no load fuel consumption Qidle/N for each injection. Alternatively, the present second learning value L2 may be an energization pulse period correction value for the TQ pulse.

If the result of the determination in Step S9 is "YES", that is, if the calculation of the second learning value L2 at the target fuel pressure PFIN of E MPa has been finished, Q1 is calculated in Step S16 as explained later. Then, it is determined whether Q1 is equal to 0 in Step S17. If the result of the determination in Step S17 is "YES", that is, if there is not the injector individual difference, the inter-cylinder injection quantity variation or the injector aging deterioration, Qb, Qc and Q2 are the same. In that case, it is determined that the entire present learning value is an increase in an engine-demanded injection quantity (an injection quantity demanded by the engine) due to an engine load factor and learning correction is stopped in Step S18.

Then, the present learning value is invalidated and the control routine of FIG. 6 is finished.

If the result of the determination in Step S17 is "NO", the final learning value (Q1/K or Q1/N) is calculated for each cylinder and for each target fuel pressure in Step S19. Meanwhile, the final learning value (Q1/K or Q1/N) is written in a map in a form shown in FIG. 12 and stored in the memory such as the stand-by RAM or the EEPROM. The stored final learning value (Q1/K or Q1/N) is reflected as the injection quantity correction value in calculation of the pilot injection quantity based on Expression (6) shown below. The injection quantity correction value can be reflected to the fuel pressure (common rail pressure) other than the target fuel pressure used in the pilot learning control through two points interpolation and the like in step S20. Thus, the injection quantity correction value can be reflected to the entire operating range of the engine 1. Then, the control routine shown in FIG. 6 is ended.

$$\text{(Pilot injection quantity)}=(QPLB+QISC\times KISC)\times QKTHF+QFCCB\times KFCCB+\text{(Learning value)}\times QKPC\times QKNE+QPLCPQ+QINT \quad \text{Expression (6)}$$

In Expression (6), QPLB is a value retrieved from a characteristic map made in advance through experimentation and the like by measuring the relations among the engine rotation speed NE, the accelerator position ACCP and the basic injection quantity, QISC is the ISC correction value, KISC is ISC correction value reflecting coefficient, QKTHF is fuel temperature correcting coefficient, QFCCB is the FCCB correction value, KFCCB is FCCB correction value reflecting coefficient, QKPC is learning value pressure sensitivity correcting coefficient, QKNE is learning value engine rotation speed sensitivity correcting coefficient, QPLCPQ is cylinder inner pressure correcting coefficient and QINT is interval-dependent correcting coefficient. The learning value is calculated with the final learning value map shown in FIG. 12 stored in the memory. The learning values corresponding to the fuel pressures other than those used for pilot learning control are calculated by two points interpolation. QPLCPQ and QINT may be injection period correction values (injector energization pulse period correction values) instead of fuel injection quantity correction values.

A method of calculating Q1 will be explained based on a time chart shown in FIG. 13.

Suppose that the engine-demanded injection quantity (no load demand injection quantity) is A mm³/st for stable idling operation, and the idling injection quantity is divided into K equal injection quantities in the multi-injection as shown by Expression (7). If there is not the injector individual difference, the inter-cylinder injection quantity variation (the variation in the actual injection quantity of the injector 4 with respect to the TQ pulse period) or the injector aging deterioration, an actual injection quantity is A mm³/st when the injection quantity command value is A mm³/st.

$$a1+a2+\ldots+aK=A \quad \text{Expression (7)}$$

where a1, a2, . . . and aK are injection quantity command values for K time divided injections with respect to the basic injection quantity or the command injection quantity.

In Expression (7), "At" represents the actual injection quantity.

In the case where one injection quantity is equally divided by N times during the compression stroke and the expansion stroke of the engine 1, an Expression (8) is provided as follows.

$$a1+a2+\ldots+aN=A \quad \text{Expression (8)}$$

where a1, a2 . . . and aN are injection quantity command values for N times divided injections.

In the case where Q1 of the injector individual difference, the inter-cylinder injection quantity variation and the injector aging deterioration quantity exists, only the actual injection quantity of A-Q1 can be injected even if the injection quantity command value is A. Furthermore, when there is an increase Q2 of the engine-demanded injection quantity due to the engine load factors such as the air conditioner or the power steering, Expression (9) is provided as follows.

$$a1+a2+\ldots+aK=A-(Q1\times K)+Q2 \quad \text{Expression (9)}$$

Result of execution of the ISC correction and the FCCB correction is shown by Expression (10).

$$a1+a2+\ldots+aK+(QISC+QFCCB)=A+Q2 \quad \text{Expression (10)}$$

Thus, Expression (11) is provided.

$$(QISC+QFCCB)=Q1\times K+Q2 \quad \text{Expression (11)}$$

Then, the result is temporarily stored in the memory such as the stand-by RAM or the EEPROM as Qb shown by Expression (12).

$$(QISC+QFCCB)=Q1\times K+Q2=Qb \quad \text{Expression (12)}$$

Next, when the injection frequency per combustion is changed to N times in the stable idling state, following Expression (13) is provided.

$$a1+a2+\ldots+aN=A-(Q1\times N)+Q2 \quad \text{Expression (13)}$$

If the ISC correction and the FCCB correction are executed, following Expression (14) is provided.

$$a1+a2+\ldots+aN+(QISC+QFCCB)=A+Q2 \quad \text{Expression (14)}$$

Thus, following Expression (15) is provided.

$$(QISC+QFCCB)=Q1\times N+Q2 \quad \text{Expression (15)}$$

The result is temporarily stored in the memory such as the standby RAM or the EEPROM as Qc shown by Expression (16).

$$(QISC+QFCCB)=Q1\times N+Q2=Qc \quad \text{Expression (16)}$$

Then, based on an injection quantity difference ($\alpha$) between Qb and Qc temporarily stored in the memory, the final learning value, which corresponds to the injector individual difference, the inter-cylinder injection quantity variation and the injector aging deterioration quantity, is calculated as shown by Expression (17), Expression (18) and Expression (19).

$$Qc-Qb=\alpha=(Q1 \times N+Q2)-(Q1 \times K+Q2) \quad \text{Expression (17)}$$

$$\alpha=(N-K) \times Q1 \quad \text{Expression (18)}$$

$$Q1=\alpha/(N-K) \quad \text{Expression (19)}$$

Thus, Q1/K or Q1/N, which is the final learning value (injection quantity correction value) corresponding to the injector individual difference, the inter-cylinder injection quantity variation and the injector aging deterioration quantity, can be correctly calculated. With the ISC correction value and FCCB correction value, the injector individual difference, the inter-cylinder injection quantity variation and the injector aging deterioration quantity can be discriminated from the increase in the engine-demanded injection quantity due to the engine load factor, regardless of a change in the engine-demanded injection quantity due to the engine load factor. If Q1 is equal to 0, that is, if there is not the injector individual difference, the inter-cylinder injection quantity variation or the injector aging deterioration, Qb and Qc are equal to Q2 as shown by Expressions (12) and (16). Therefore, the injection quantity difference is not generated. In this case, it is determined that the entire part of the present learning value is the increase of the engine-demanded injection quantity due to the engine load factor. Then, the learning correction is stopped and the present learning value is invalidated.

Normally, the command injection quantity QFIN is calculated by adding the injection quantity correction value to the basic injection quantity set in accordance with the operating state or the operating condition of the engine 1. The injection quantity command value calculated in accordance with the command injection quantity QFIN and the common rail pressure NPC can be represented mainly by Expression (20) shown below.

(Injection quantity command value)=(Basic injection quantity)+
(Injection quantity correction value)=(Basic injection quantity)+(*ISC* correction value+
*FCCB* correction value)      Expression (20)

The ISC correction value and the FCCB correction value include Q1 and Q2. Q1 corresponds to the injector individual difference, the inter-cylinder injection quantity variation and the injector aging deterioration quantity. Q2 corresponds to the variation in the engine-demanded injection quantity.

Figure 13:
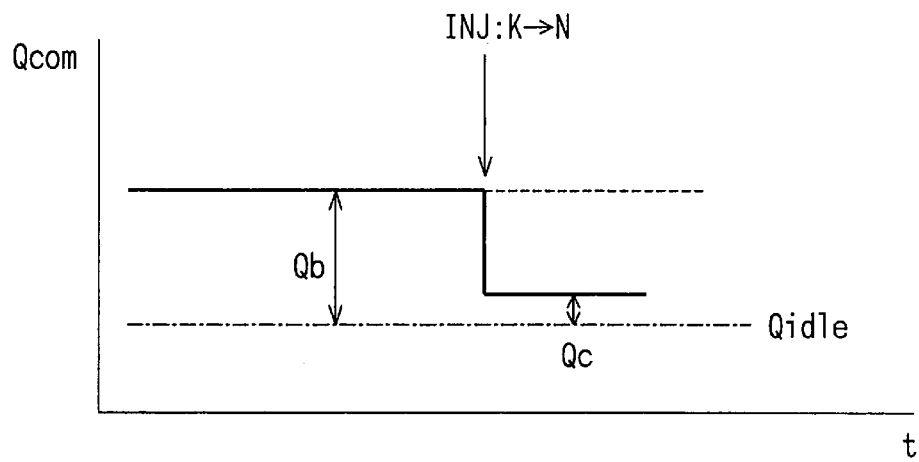
FIG. 13 is a time chart showing a change in an injection quantity command value when an injection frequency is switched from K times to N times according to the first embodiment.

As shown in FIG. 13, when the injection frequency per combustion in the multi-injection is switched to N times (for example, 3 times) from a state in which the injection frequency per combustion in the multi-injection is stabilized at K times (for example, 5 times) (stable idling state, where the learning correction executing conditions are established), the engine-demanded injection quantity is constant. Therefore, Expressions (21) and (22) shown below are provided. In FIG. 13, $Q_{com}$ represent the injection quantity command value.

$$\text{(basic injection quantity)}+(Q1 \times K)+Q2=\text{(basic injection quantity)}+(Q1 \times N)+Q2-\alpha \quad \text{Expression (21)}$$

$$Q1=\alpha/(N-K) \quad \text{Expression (22)}$$

Therefore, by changing the injection frequency per combustion in the multi-injection in the stable idling state and by detecting a change in the injection quantity command value or a difference in the injection quantity at that occasion, the injector individual difference, the inter-cylinder injection quantity variation and the injector aging deterioration quantity can be calculated regardless of the change in the engine-demanded injection quantity. Thus, the increase of the engine-demanded injection quantity due to the engine load factor can be discriminated from the injector individual difference, the inter-cylinder injection quantity variation and the injector aging deterioration quantity.

Thus, excessive correction of the correction value for each injection per combustion in the multi-injection due to erroneous learning and erroneous correction or excessive learning and excessive correction can be prevented. As a result, combustion noise, engine vibration or deterioration in exhaust gas performance (exhaust emission) of the engine 1 can be prevented. Furthermore, the variation in the engine-demanded injection quantity, particularly the variation in the engine-demanded injection quantity due to the engine load factor can be discriminated from the injector individual difference, the inter-cylinder injection quantity variation and the injector aging deterioration quantity. Therefore, the state in which the engine load such as electric load is applied can be detected. As a result, the injection quantity correction value (learning value) corresponding to the injector individual difference, the inter-cylinder injection quantity variation and the injector aging deterioration quantity can be calculated, without including the variation in the engine-demanded injection quantity due to the engine load factor. Thus, aimed injection quantity or injector energization pulse period is continued until the next calculation of the learning value. As a result, the engine performance deterioration is inhibited.

Furthermore, even if the first learning value and the second learning value including the variation in the engine-demanded injection quantity due to the engine load factor, a normal injection quantity correction value (learning value) corresponding to the injector individual difference, the inter-cylinder injection quantity variation and the injector aging deterioration quantity can be calculated without including the variation in the engine-demanded injection quantity due to the engine load factor. Therefore, the pilot learning executing conditions can be relaxed. As a result, the pilot learning executing conditions can be established in a wide range.

In the embodiment, the injection quantity correction value corresponding to the injector individual difference, the inter-cylinder injection quantity variation and the injector aging deterioration quantity is calculated for each cylinder under a plurality of different common rail pressures, not limiting to the target fuel pressure (PFIN) in the idling operation. Therefore, the respective learning values can be reflected over a wide operating region in the normal engine operation. Thus, an ideal correlation between the injector energization pulse period and the pilot injection quantity can be provided over an entire operating region of the engine 1.

In addition, learning values corresponding to the target injection pressure other than A, B, C, D, and E are calculated by carrying out two points interpolation or the like. Therefore, the learning value stored in the memory can be reflected in calculation of the pilot injection quantity as the injection quantity correction value over the entire region of use of the actual fuel injection, other than the fuel injection pressure in pilot learning control. Thus, the ideal correlation between the command injection pulse period (injector energization pulse period) and the pilot injection quantity can be always provided.

Second Embodiment

Figure 14:
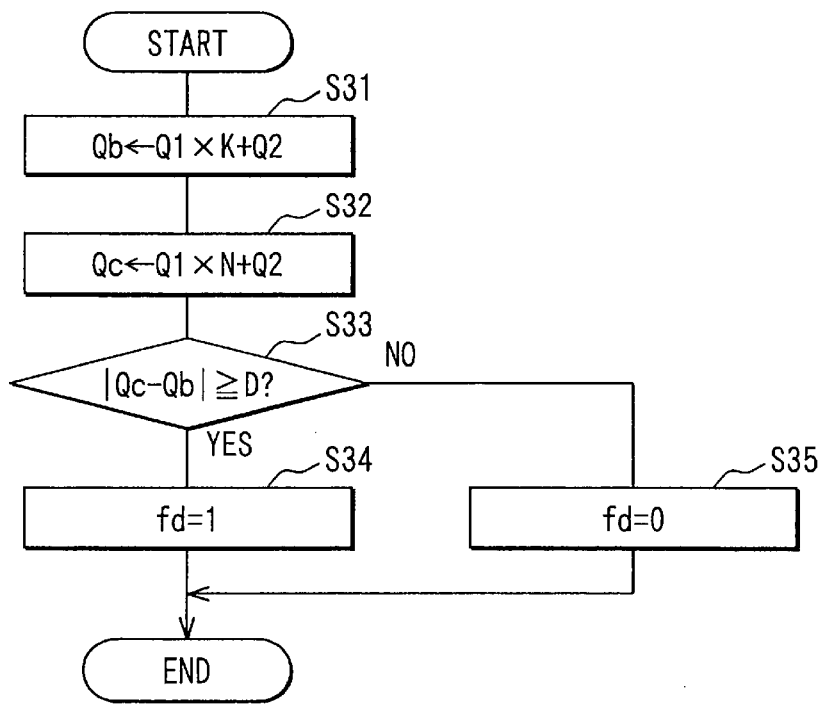
FIG. 14 is a flowchart showing a pilot learning control method according to a second embodiment of the present invention.

Next, a method of pilot learning control according to the second embodiment will be explained based on FIG. 14.

In the second embodiment, even if Q1 as the final injection quantity correction value and Q2 as the increase quantity of the engine-demanded injection quantity due to the engine load factor are not calculated, the first learning value corresponding to the target fuel pressure PFIN of, for instance, A MPa is read from the memory. Then, Qb for K times injections is calculated based on Expression (23) shown below in Step S31.

$$(QISC+QFCCB)=Q1 \times K+Q2\ Qb \qquad \text{Expression (23)}$$

where Q1 designates the injector individual difference, the inter-cylinder injection quantity variation and the injector aging deterioration quantity, Q2 designates the variation in the engine-demanded injection quantity, and K designates the injection frequency per combustion in the multi-injection.

Then, the second learning value corresponding to the target fuel pressure PFIN of A MPa is read from the memory and Qc of N times injections is calculated based on Expression (24) shown below in step S32.

$$(QISC+QFCCB)=Q1 \times N+Q2=Qc \qquad \text{Expression (24)}$$

In Expression (24), Q1 designates the injector individual difference, the inter-cylinder injection quantity variation and the injector aging deterioration quantity, Q2 designates the variation in the engine-demanded injection quantity and N designates the injection frequency per combustion in the multi-injection.

Then, it is determined whether an injection quantity difference between Qb and Qc is equal to or greater than a reference D in Step S33. If the result of the determination is "YES", that is, if the injection quantity difference is equal to or greater than the reference D as shown by Expression (25) shown below, it can be determined that there is the injector individual difference, the inter-cylinder injection quantity variation, or the injector aging deterioration. Then, in Step S34, a flag "fd" for indicating the existence of the injector individual difference, the inter-cylinder injection quantity variation, or the injector aging deterioration is set to 1.

$$|Qc-Qb| \geq D \qquad \text{Expression (25)}$$

where D is a constant.

If the result of the determination in step S33 is "NO", that is, if the difference is less than the reference D as shown by Expression (26) shown below, it is determined that there is only the change in the engine-demanded injection quantity due to the engine load factor. Then, in Step S35, the flag fd is set to 0.

$$|Qc-Qb|<D \qquad \text{Expression (26)}$$

where D is a constant.

Modifications

In the embodiments, the invention is applied to the pilot injection quantity learning control device of the common rail type fuel injection system for the diesel engine. Alternatively, the invention may be applied to an injection quantity control system for an internal combustion engine which is not provided with a common rail but is provided with a distribution type fuel injection pump of an electronic control type or a column type fuel injection pump of an electronic control type or the like. In the embodiments, the injector. 4 having the electromagnetic type fuel injection valve is used. Alternatively, an injector having a fuel injection valve of a piezoelectric type may be used. The frequency of the pilot injection (pre-injection) performed before the main injection may arbitrarily be set to one time or more. Alternatively, also a frequency of pilot injection (after injection) performed after main injection may be arbitrarily set to 0 time, one time or more.

In the embodiments, the injection quantity is divided accurately equally into K times or N times injections in Step S4 or Step S12 of the control routine shown in FIG. 5. The injection quantity need not be divided accurately equally. For instance, when the totalQ is 5 $mm^3/st$, the injection quantity may be divided substantially equally into to 4 times injections of 1 $mm^3/st$, 1 $mm^3/st$, 1 $mm^3/st$ and 2 $mm^3/st$. In that case, the FCCB correction value and the ISC correction value may be reflected to the respective injections by reflecting pertinently in accordance with a certain dividing method such as proportional distribution of 1: 1: 1: 2, or equal distribution. Then, the learning values are calculated in Steps S7, S15, and S19 of the control routine shown in FIGS. 5 and 6. Thus, an effect substantially equivalent to that of the embodiments can be achieved.

In the embodiments, the standby RAM or the EEPROM is used as the learned correction value storing means. Alternatively, the preceding learning value or the present learning value renewed by the pilot learning control may be stored in a nonvolatile memory such as EPROM or a flash memory, or other storage medium such as DVD-ROM, CD-ROM or flexible disk, instead of the standby RAM or the EEPROM. Also in this case, stored contents are preserved even after switching off (IG/OFF) the ignition switch or pulling the engine key out of the key cylinder.

In the embodiments, the invention is applied to the common rail type fuel injection system capable of performing the multi-injection including at least two times of fuel injections (for instance, the pilot injection and the main injection) during the compression stroke and the expansion stroke of the engine 1 by driving the electromagnetic valve of the injector 4 of a specific cylinder a plurality of times. Alternatively, the invention may be applied to a fuel injection system for an internal combustion engine capable of performing multi-injection including three times of injections (for instance, a series of a pilot injection, a main injection and an after injection, or a series of a pilot injection, a pre-injection and a main injection) during the compression stroke and the expansion stroke of the engine 1.

Alternatively, the invention may be applied to the fuel injection system for an internal combustion engine capable of performing multi-injection including four times of injections (for instance, a series of a pilot injection, a main injection, an after injection and a post injection, or a series of a pilot injection, a pre-injection, a main injection, and an after injection) during the compression stroke and the expansion stroke of the engine .1. Alternatively, the invention may be applied to a fuel injection system for an internal combustion engine capable of performing multi-injection including five times of injections (for instance, a series of a pilot injection, a pre-injection, a main injection, an after injection, and a post injection, or a series of three times of pilot injections, ma an injection, and an after injection) during the compression stroke and the expansion stroke of the engine 1. Alternatively, the invention may be applied to a fuel injection system for an internal combustion engine capable of performing multi-injection including six or more times of injections (for instance, a series of four or more times of pilot injections, a main injection and an after injection, or a series of three or more times of pilot injections, a main injection, and two or more times after injection) during the compression stroke and the expansion stroke of the engine 1.

In the embodiments, the injection quantity difference between Qb and Qc is calculated (detected) when the target fuel pressure PFIN is A MPa, for instance. Alternatively, the injection quantity difference between Qb and Qc may be calculated. (detected) when the target fuel pressure PFIN is B MPa, C MPa, D MPa or E MPa, for instance. Alternatively, the injection quantity difference between Qb and Qc may be calculated (detected) for each cylinder of the engine 1 and for each target fuel pressure. Conversely, the injection quantity difference between Qb and Qc may be calculated (detected) only for a specific cylinder (for example, #1 cylinder) and the calculated injection quantity difference may be reflected to the other cylinders.

The present invention should not be limited to the disclosed embodiments, but may be implemented in many other ways without departing from the spirit of the invention.

What is claimed is:

1. A fuel injection quantity control system for an internal combustion engine, in which a command injection quantity is calculated by adding an injection quantity correction value to a basic injection quantity set in accordance with an operating state or an operating condition of the engine, an injection quantity command value is calculated in accordance with the command injection quantity and a fuel injection pressure, and injectors mounted in cylinders of the engine are driven in accordance with the injection quantity command value, the fuel injection quantity control system comprising;

multi-injection frequency switching means for switching an injection frequency per combustion in multi-injection to K times or N times different from the K times when a predetermined operating state or a predetermined operating condition of the engine is detected, wherein the multi-injection is performed to inject fuel into the cylinder by a plurality of times by driving the injector by a plurality of times during a compression stroke and an expansion stroke;

first equal division correcting means for dividing the command injection quantity into K times injections for each cylinder when the injection frequency is switched to K times, for detecting a rotation speed variation of each cylinder, for comparing the rotation speed variation of each cylinder with an average value of the rotation speed vibrations of all the cylinders, for correcting an injection quantity of each injection for each cylinder with a first correction value to equalize the rotation speed variations of all the cylinders while performing K times divided injections, for detecting an average engine rotation speed of all the cylinders, for comparing the average engine rotation speed with a target rotation speed, and for correcting the injection quantity for each injection uniformly for all the cylinders with a second correction value to maintain the average engine rotation speed to the target rotation speed while performing the K times divided injections;

second equal division correcting means for dividing the command injection quantity into N times injections for each cylinder when the injection frequency is switched to N times, for detecting the rotation speed variation of each cylinder, for comparing the rotation speed variation of each cylinder with the average value of the rotation speed vibrations of all the cylinders, for correcting the injection quantity of each injection for each cylinder with a third correction value to equalize the rotation speed variations of all the cylinders while performing N times divided injections, for detecting the average engine rotation speed of all the cylinders, for comparing the average engine rotation speed with the target rotation speed, and for correcting the injection quantity for each injection uniformly for all the cylinders with a fourth correction value to maintain the average engine rotation speed to the target rotation speed while performing the N times divided injections;

first correction value determining means for calculating the first correction value of each cylinder in accordance with a deviation between the detected value of the rotation speed variation of each cylinder and the average value of the rotation speed variations of all the cylinders when the injection frequency per combustion in the multi-injection is switched to K times and for calculating the second correction value required for maintaining the average engine rotation speed to the target rotation speed;

second correction value determining means for calculating the third correction value of each cylinder in accordance with the deviation between the detected value of the rotation speed variation of each cylinder and the average value of the rotation speed variations of all the cylinders when the injection frequency per combustion in the multi-injection is switched to N times and for calculating the fourth correction value required for maintaining the average engine rotation speed to the target rotation speed; and erroneous correction discriminating means for discriminating an injector individual difference, an inter-cylinder injection quantity variation, and an injector aging deterioration quantity from variation in an engine-demanded injection quantity based on change in the injection quantity command value or a difference in an injection quantity between a first injection quantity command value and a second injection quantity command value, wherein the first injection quantity command value is a sum of the injection quantity command value, the first correction value and the second correction value, and the second injection quantity command value is a sum of the injection quantity command value, the third correction value and the fourth correction value.

2. The injection quantity control system as in claim 1, wherein the erroneous correction discriminating means determines that there is the injector individual difference, the inter-cylinder injection quantity variation or the injector aging deterioration quantity if the difference between the first injection quantity command value and the second injection quantity command value is equal to or greater than a predetermined value, and the erroneous correction discriminating means determines that there is only a change in the engine-demanded injection quantity due to an engine load factor if the difference between the first injection quantity command value and the second injection quantity command value is less than the predetermined value.

3. The injection quantity control system as in claim 1, further comprising:

learning value storing means for storing a sum of a value produced by dividing the first correction value of each cylinder by K, another value produced by dividing the second correction value by K and a preceding learning value as a renewed learning value for each cylinder, wherein the renewed learning value is the injection quantity correction value per combustion in the multi-injection corresponding to the injector individual difference, the inter-cylinder injection quantity variation and the injector aging deterioration quantity, or an energization period correction value applied to the injector per combustion in the multi-injection.

4. The injection quantity control system as in claim 1, further comprising:

learning value storing means for storing a sum of a value produced by dividing the third correction value of each cylinder by N, another value produced by dividing the fourth correction value by N and a preceding learning value as a renewed learning value for each cylinder, wherein the renewed learning value is the injection quantity correction value per combustion in the multi-injection corresponding to the injector individual difference, the inter-cylinder injection quantity variation and the injector aging deterioration quantity, or an energization period correction value applied to the injector per combustion in the multi-injection.

5. The injection quantity control system as in claim 4, further comprising:

learning value reflecting means for reflecting the learning value stored by the learning value storing means to calculation of the injection quantity of each injection per combustion in the multi-injection of each cylinder or calculation of the energization period to the injector per combustion in the multi-injection of each cylinder.

6. The injection quantity control system as in claim 1, wherein the predetermined operating state or the predetermined operating condition of the engine is detected when a low-load and low-rotation state is detected, when a stable idling state is detected, or when a state in which at least a running speed of a vehicle is equal to or less than a predetermined value, the engine rotation speed is equal to or less than a predetermined value, an accelerator position is equal to or less than a predetermined value and the command injection quantity is equal to or less than a predetermined value is detected.

* * * * *